(12) United States Patent
Sato

(10) Patent No.: US 7,400,651 B2
(45) Date of Patent: Jul. 15, 2008

(54) DEVICE AND METHOD FOR INTERPOLATING FREQUENCY COMPONENTS OF SIGNAL

(75) Inventor: Yasushi Sato, Nagareyama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 965 days.

(21) Appl. No.: 10/362,421

(22) PCT Filed: Jun. 29, 2001

(86) PCT No.: PCT/JP01/05620

§ 371 (c)(1),
(2), (4) Date: Feb. 25, 2003

(87) PCT Pub. No.: WO03/003345

PCT Pub. Date: Jan. 9, 2003

(65) Prior Publication Data

US 2004/0098431 A1 May 20, 2004

(51) Int. Cl.
*H04J 1/00* (2006.01)
(52) U.S. Cl. ............... 370/482; 370/521; 370/480; 370/497; 375/261; 375/295; 375/324; 704/266; 704/230; 704/258
(58) Field of Classification Search ............... 370/482, 370/521, 480, 497; 375/261, 298, 295, 324; 704/266, 230, 207, 223, 258, 268
See application file for complete search history.

(56) References Cited

U.S. PATENT DOCUMENTS 4,674,125 A * 6/1987 Carlson et al. ............ 382/303

(Continued)

FOREIGN PATENT DOCUMENTS

JP 2-235424 9/1990

(Continued)

OTHER PUBLICATIONS

Written Notification of Reason for Refusal dated Sep. 25, 2006, Japanese Patent Office, for Application No. 2003-509435.

(Continued)

*Primary Examiner*—Edan Orgad
*Assistant Examiner*—Andrew C Lee
(74) *Attorney, Agent, or Firm*—Eric J. Robinson; Robinson Intellectual Property Law Office, P.C.

(57) ABSTRACT

A frequency interpolation apparatus is provided which reproduces a signal similar to an original signal by approximately recovering suppressed frequency components, from an input signal having the suppressed frequency components in a specific frequency band of the original signal. The input signal is divided into a plurality of signal component sets each having frequency components in a frequency band among a plurality of frequency bands, and a signal component set in the band with the suppressed signal components is synthesized from the plurality of divided signal component sets and added to the input signal. Each of the plurality of divided signal component sets is frequency-converted to a signal component set in the same frequency band, and the signal component set in the band with the suppressed signal components is synthesized through linear combination of the frequency-converted signal component sets. Spectrum envelope information of the frequency components not suppressed but residual in the original signal is extracted and the level of the signal component set to be synthesized is determined from the spectrum envelope information.

8 Claims, 11 Drawing Sheets

U.S. PATENT DOCUMENTS

| | | | |
|---|---|---|---|
| 5,926,788 A * | 7/1999 | Nishiguchi | 704/265 |
| 6,115,684 A * | 9/2000 | Kawahara et al. | 704/203 |
| 6,711,538 B1 * | 3/2004 | Omori et al. | 704/223 |
| 6,782,133 B2 * | 8/2004 | Yokose et al. | 382/232 |
| 6,836,761 B1 * | 12/2004 | Kawashima et al. | 704/258 |
| 2001/0051870 A1 * | 12/2001 | Okazaki et al. | 704/207 |

FOREIGN PATENT DOCUMENTS

| | | |
|---|---|---|
| JP | 3-254223 | 11/1991 |
| JP | 05-172869 | 7/1993 |
| JP | 6-85607 | 3/1994 |
| JP | 6-222799 | 8/1994 |
| JP | 6-294830 | 10/1994 |
| JP | 9-90992 | 4/1997 |
| JP | 9-258787 | 10/1997 |
| JP | 10-97287 | 4/1998 |
| JP | 2000-36755 | 2/2000 |
| JP | 2001-83995 | 3/2001 |
| WO | WO98/57436 | 12/1998 |

OTHER PUBLICATIONS

International Search Report, Oct. 9, 2001.

* cited by examiner

FIG. 6
(a)
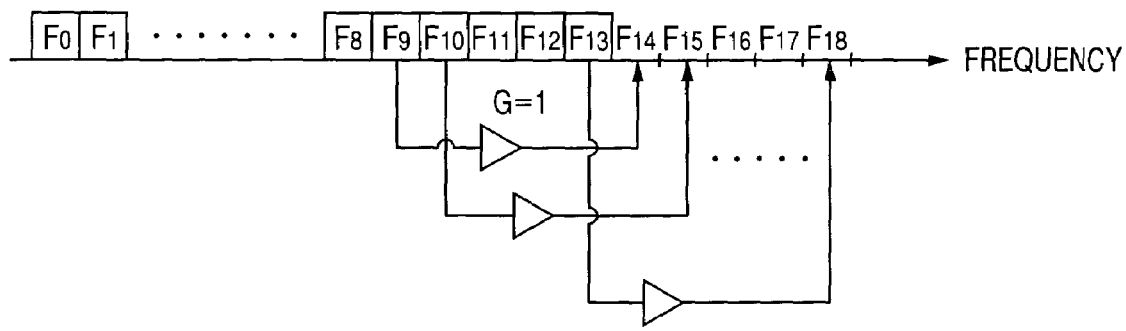
(b)
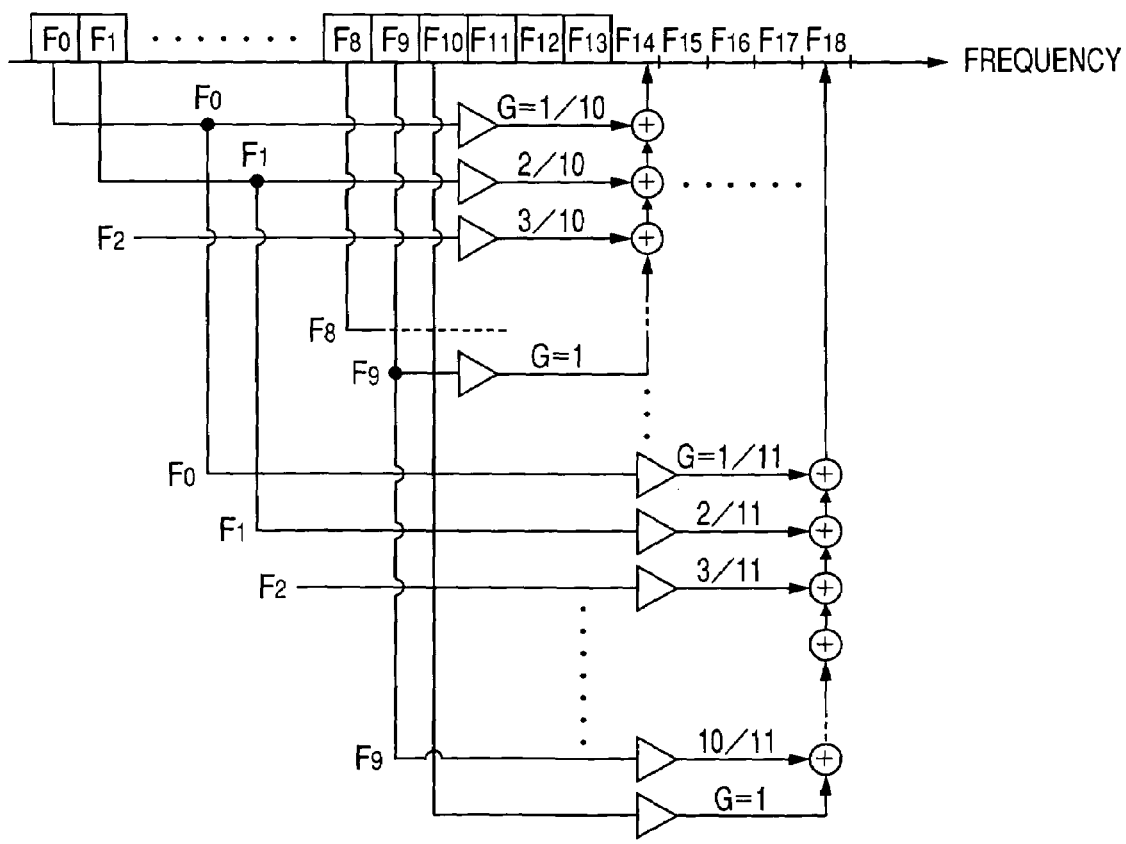

FIG. 7
(a)
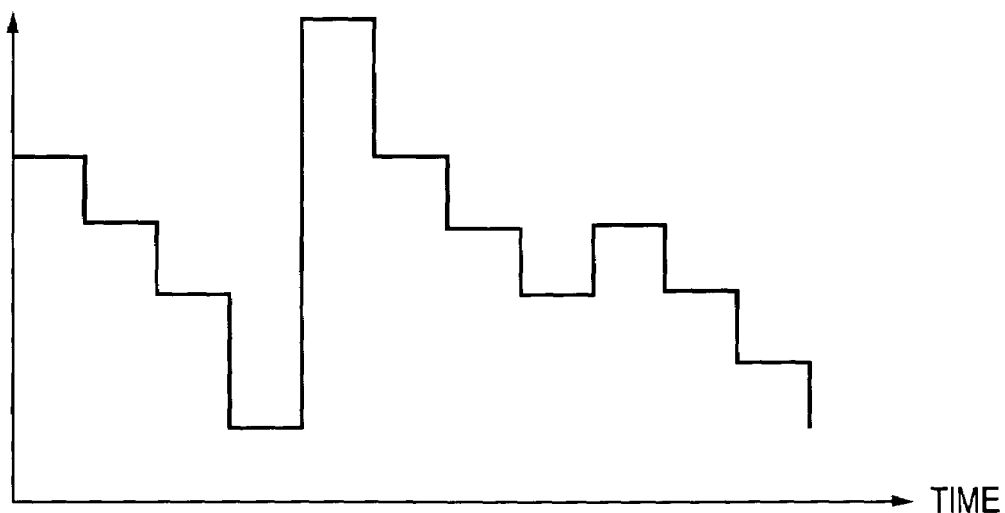
(b)
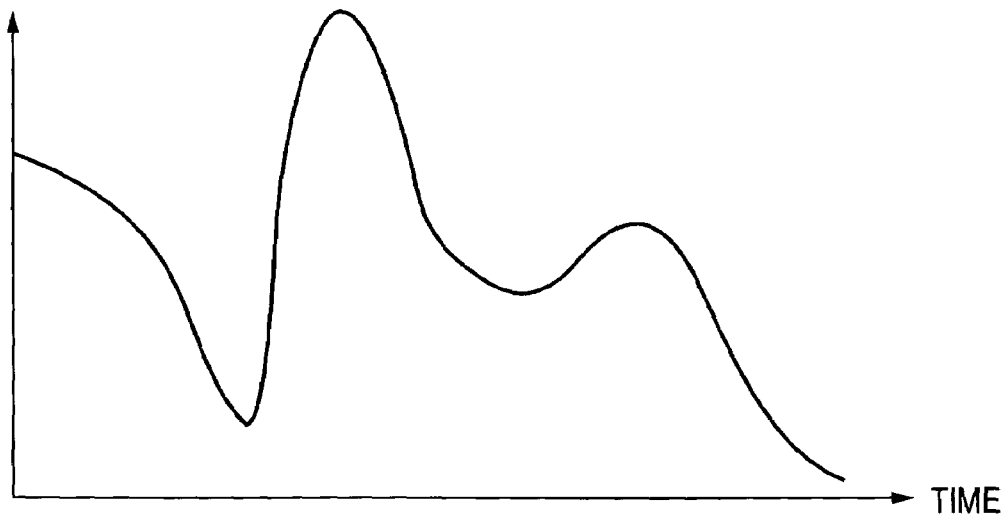

FIG. 8
(a)
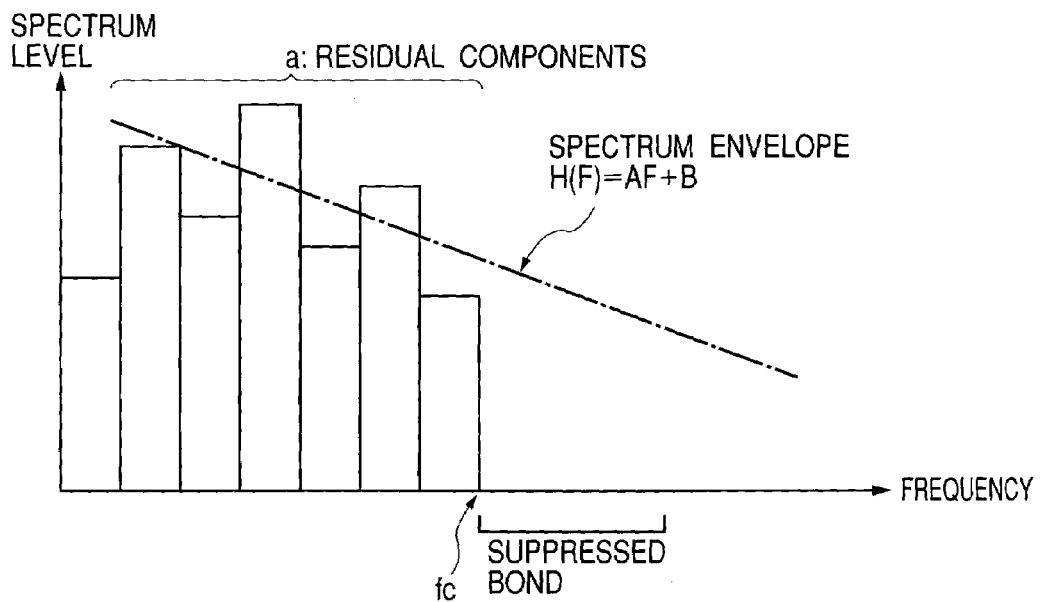
(b)
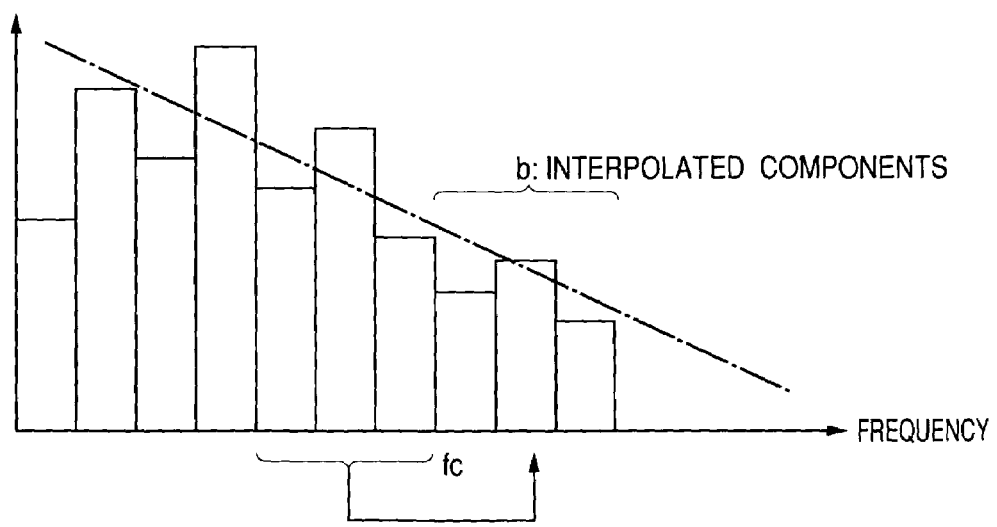

DEVICE AND METHOD FOR INTERPOLATING FREQUENCY COMPONENTS OF SIGNAL

BACKGROUND OF THE INVENTION
1. Field of the Invention

The present invention relates to a frequency interpolation apparatus and method for obtaining through synthesis approximate values of the frequency components of a given signal removed or suppressed in a specific frequency band, and interpolating the approximate values to the given signal to thereby improve spectrum distribution.

2. Description of the Related Art

Music data is widely distributed recently in the form of MP3 (MPEG1 audio layer 3), FM (frequency modulation) broadcasting, television sound multiplex broadcasting and the like. In order to avoid an increase in data amount to be cased by an excessively broad bandwidth and prevent an occupied bandwidth from being broadened, the high frequency components of a subject audio signal or the like are suppressed to lower the upper limit frequency. For example, if the frequency components of 15 kHz and higher of an audio signal having an upper limit frequency of 20 kHz are suppressed to lower the upper limit frequency, the sampling frequency can be lowered by ¾ so that the data rate can be lowered. However, it is obvious that the sound quality is degraded as compared to that of the original signal. It has been studied to approximately recover the suppressed frequency components. One approach to frequency components recovery is to distort a subject signal, extract the frequency components to be used for suppressed bandwidth interpolation from the distorted signal by using a filter, and add the extracted frequency components to the subject signal to recover the original signal.

Another approach is to extract sound components having combinations of fundamental and harmonic components from an original audio signal, predict the harmonic components higher than the band of the original audio signal from the extracted sound components, and exterpolate the predicted harmonic components to the original audio signal.

According to the former approach, the waveform of an audio signal is distorted by using a limiter circuit or the like to generate harmonics so that it is not certain whether the harmonics can approximate those contained in the original audio signal.

If the latter approach is applied to an original audio signal obtained by limiting the band of an original voice or the like, it is not possible for tone color components of pure sound to predict the harmonic components and exterpolate them. Similarly, it is not possible for sound components with the harmonic components being removed by band limitation to predict the removed harmonic components and exterpolate them.

According to another approach developed recently, a subject signal is frequency-analyzed to estimate the residual spectrum pattern, intensity and the like of suppressed frequency components from the analyzed spectrum pattern, synthesize the estimated parameters and add them to the subject signal. Although this approach is excellent in terms of sound quality improvement, there is some practical problem. Namely this approach requires a great amount of calculations in digital signal processing, because it requires Fourier transform and inverse Fourier transform of high resolution and short time over the board band of the subject main signal.

This results in excessive requirements of the arithmetic operation rate and circuit scale of a digital signal processor (DSP) and hence lowered practical value.

The present invention has been made under the above-described circumstances and aims to provide a signal interpolating apparatus and method for recovering an original signal at a high quality from an audio signal with a suppressed specific frequency band, and a signal interpolating apparatus and method for efficiently recovering a signal approximate to the original signal even with a relatively small arithmetic operation scale.

SUMMARY OF THE INVENTION

In order to achieve the above-described objective, a frequency interpolation apparatus of this invention aiming to reproduce a signal similar to an original signal by approximately recovering suppressed frequency components, from an input signal having the suppressed frequency components in a specific frequency band of the original signal, operates in such a manner that the input signal is divided into a plurality of signal component sets each having frequency components in a frequency band among a plurality of frequency bands, and a signal component set in the band with the suppressed signal components is synthesized from the plurality of divided signal component sets and added to the input signal.

Each of the plurality of divided signal component sets is frequency-converted to a signal component set in the same frequency band, and the signal component set in the band with the suppressed signal components is synthesized through linear combination of the frequency-converted signal component sets. The apparatus of this invention comprises means for extracting spectrum envelope information of the frequency components not suppressed but residual in the original signal, wherein a level of the signal component set to be synthesized is determined from the spectrum envelope information. Preferably, the spectrum envelope information is represented by a predetermined function expression obtained through frequency analysis of the input signal. The function expression uses the most simple first order function in order to efficiently perform the interpolation process. The plurality of divided signal component sets are generated by using a plurality of band pass filters each having a constant pass band width. In this invention, the input signal is typically a digital audio signal obtained by sampling and quantizing an analog audio signal.

According to another aspect of the invention, the frequency interpolation apparatus comprises: means for dividing an input signal into a plurality of signal component sets each having frequency components in a frequency band among a plurality of frequency bands; means for subjecting the plurality of divided signal component sets to make each signal component set have the same frequency band; means for frequency-analyzing the input signal to extract spectrum envelope information of residual frequency components; means for synthesizing an interpolation signal component set having the suppressed frequency components by using the divided and frequency-converted signal component sets, and determining the level of the synthesized interpolation signal component set in accordance with the extracted spectrum envelope information; and means for inverse-frequency converting the frequency-converted signal component sets to recover the signal component sets in the original frequency band. In this apparatus, synthesizing the signal component set in the band with the suppressed signal components is executed through linear combination of some signal component sets having residual frequency components.

The frequency interpolation apparatus of this invention may be realized by a simple structure including means for filtering an input signal to generate a signal component set containing some of frequency components not suppressed but residual, and means for frequency-converting the signal component set to synthesize a signal component set having the suppressed frequency components and add the synthesized signal component set to the input signal. This simplified apparatus comprises means for extracting spectrum envelope information of frequency components of the input signal not suppressed but residual, wherein the level of the signal component set to be synthesized is determined in accordance with the spectrum envelope information.

The signal interpolation apparatus of this invention is constructed as described above. It is therefore possible to synthesize with relatively high fidelity the frequency components contained in the original signal before signal components in a specific band are suppressed, to thereby interpolate the suppressed signal components. A signal having a good similarity to the original signal can therefore be recovered, and an audio signal or the like can be reproduced with low distortion and high quality.

Since the circuits operating non-linearly are not used at all, even if there are some signal distortion, this signal distortion is limited only to linear distortion audibly allowed. It can be said therefore that audible distortion is very small.

In the apparatus of this invention, since the main signal itself is processed, Fourier transform and inverse Fourier transform for a broadband signal and of high resolution are not used. In the method of this invention, although the frequency components of a signal are processed, the main signal itself is not converted from its "time domain" to "frequency domain" or conversely from its "frequency domain" to time domain". In this embodiment, although the Fourier transform is partially used, this transform is applied only to predicting the envelope of residual spectra and does not require high resolution. In this invention, the main signal is processed not by Fourier transform but by linear filters, i.e., band pass filters. It is advantageous in that the amount of calculations in signal processing can be reduced considerably. The frequency interpolation apparatus of the invention can fully realize the calculations necessary for digital signal processing by using only one-chip audio signal DSP, and has a high practical value.

BRIEF DESCRIPTION OF THE DRAWINGS

FIGS. 6(a) and 6(b) are diagrams illustrating examples of frequency interpolation.

FIGS. 7(a) and 7(b) are graphs illustrating the operation of a filter to be inserted in order to smooth the temporal variation of frequency analysis data (Fourier coefficients).

FIGS. 8(a) and 8(b) are graphs showing examples of spectrum patterns residual in a signal and after interpolation, and first order function straight lines representative of envelope information.

DETAILED DESCRIPTION OF THE PREFERRED EMBODIMENTS

Embodiments of a frequency interpolation apparatus of the invention will be described in detail with reference to the accompanying drawings.

Figure 1:
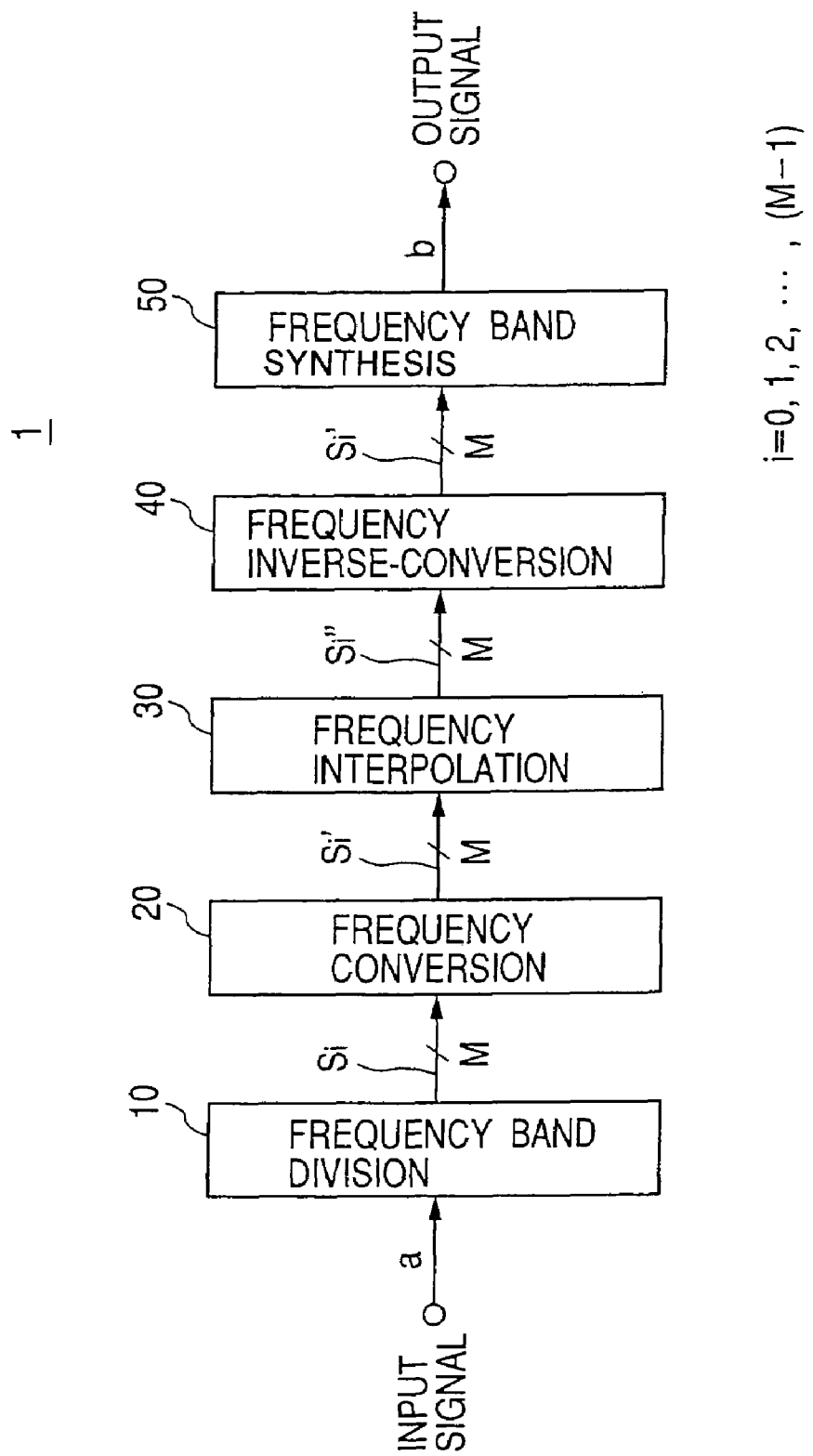
FIG. 1 is a diagram showing the fundamental structure of a frequency interpolation apparatus of the invention.

FIG. 1 is a diagram showing the fundamental structure of a frequency interpolation apparatus according to the invention. As shown, the apparatus of this invention is mainly constituted of a frequency band division section, a frequency conversion section, a frequency interpolation section, a frequency inverse-conversion section, and a frequency band synthesis section.

In this invention, a signal to be subjected to frequency interpolation (a signal with frequency components in a specific frequency band removed or suppressed) is first input to the frequency division section 10. In the frequency band division section 10, the input signal is divided into M signal components ($S_1, S_2, S_3, \ldots, S_{M-1}$) having frequency components in a predetermined plurality (M) of frequency bands ($F_0, F_1, F_2, \ldots, F_{M-1}$). Each of the signal components $S_i$ (i= 0, ..., M−1) obtained by frequency band division is supplied to the frequency conversion section 20 whereat it is frequency-shifted so that the frequency bands $F_0, F_1, F_2, \ldots, F_{M-1}$ of the signal components are converted into one specific frequency band (typically, the lowest frequency band $F_0$). Next, at the frequency interpolation section 30, some of the frequency converted signal components $S_i'$ (i=1, 2, ..., M−1) are synthesized to generate signal components in the suppressed frequency bands (e.g., signal components $S_{M-2}'$, $S_{M-1}'$, and $S_M'$). This process corresponds to an actual frequency interpolation process. Thereafter, at the frequency inverse-conversion section 40, the frequency band of each of the frequency converted signal components $S_i'$ (i=0 to M−1) recovers the original frequency band. Lastly, the divided signal components are coupled to obtain a desired signal whose frequency components were interpolated.

FIGS. 2(a) to 2(c) and FIGS. 3(a) to 3(c) schematically show the configuration of a signal at each step in order to intuititively grasp the flow of signal processing described above.

Figure 2:
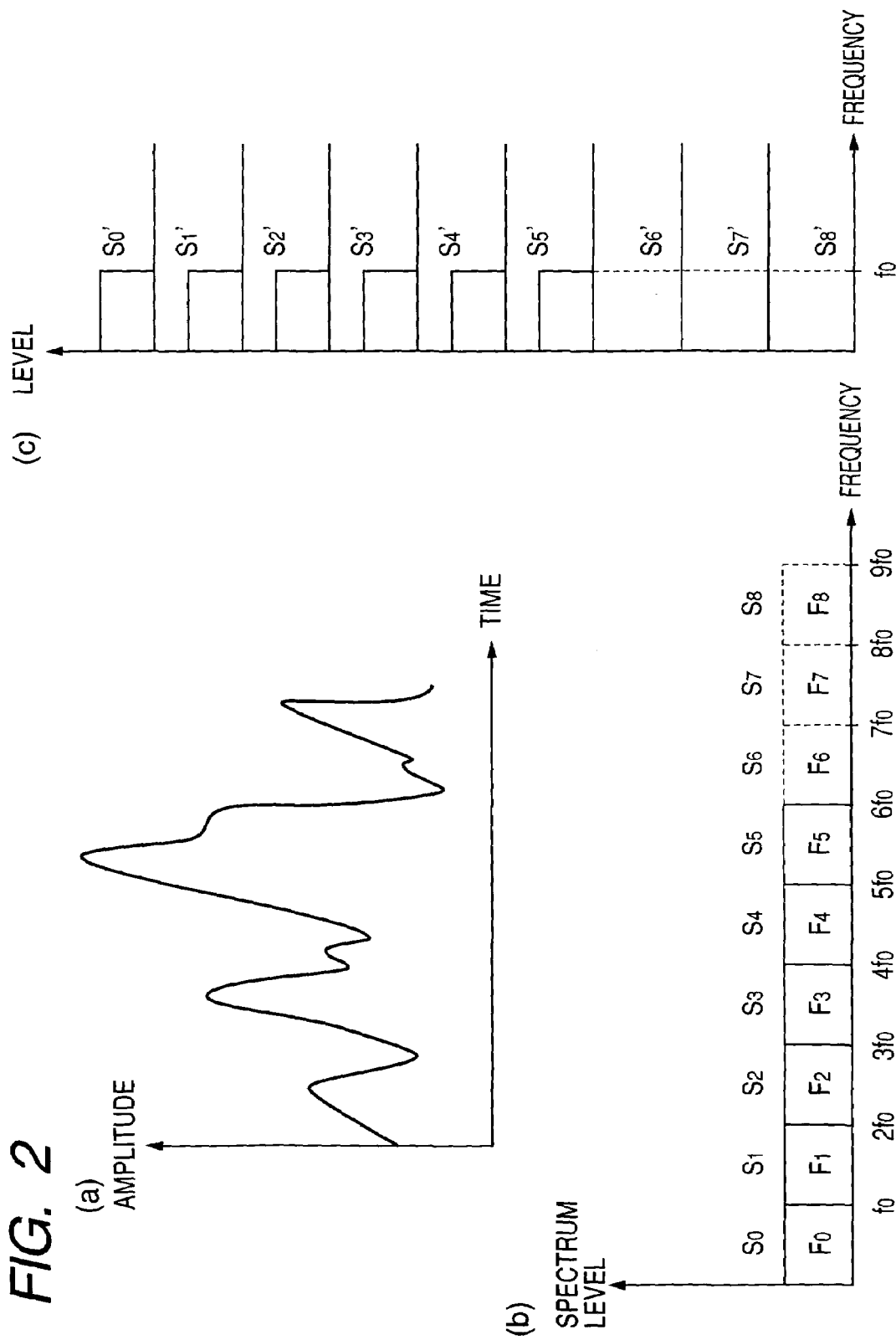
FIGS. 2(a) to 2(c) are schematic diagrams showing the configuration of a signal at each step of the former half signal processing to be executed by the apparatus of the invention.

FIG. 2(a) shows an input signal (whose frequency components in a specific frequency band were removed or suppressed) in a time domain. FIG. 2(b) shows the frequency bands of the input signal. In this example, the input signal is divided into M (M=9) frequency bands each having a bandwidth of $f_0$. It is assumed that the frequency components in the seventh, eighth and ninth frequency bands ($F_6, F_7$ and $F_8$) were suppressed. FIG. 2(c) shows the spectrum distribution of the signal components after frequency conversion, the occupied frequency band of each of the frequency components (spectrum) being 0 to $f_0$ (Hz).

Figure 3:
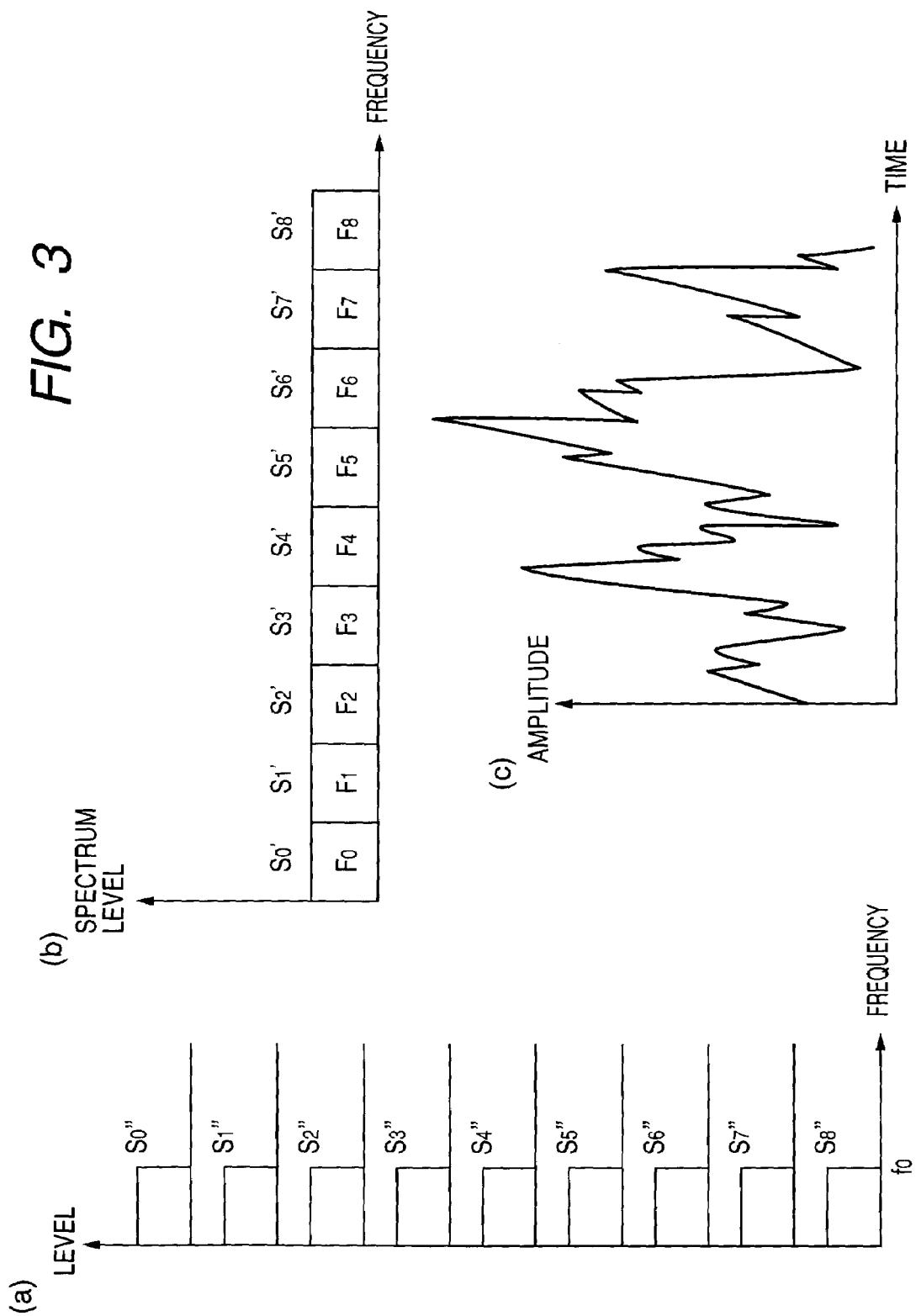
FIGS. 3(a) to 3(c) are schematic diagrams showing the configuration of a signal at each step of the latter half signal processing to be executed by the apparatus of the invention.
Figure 4:
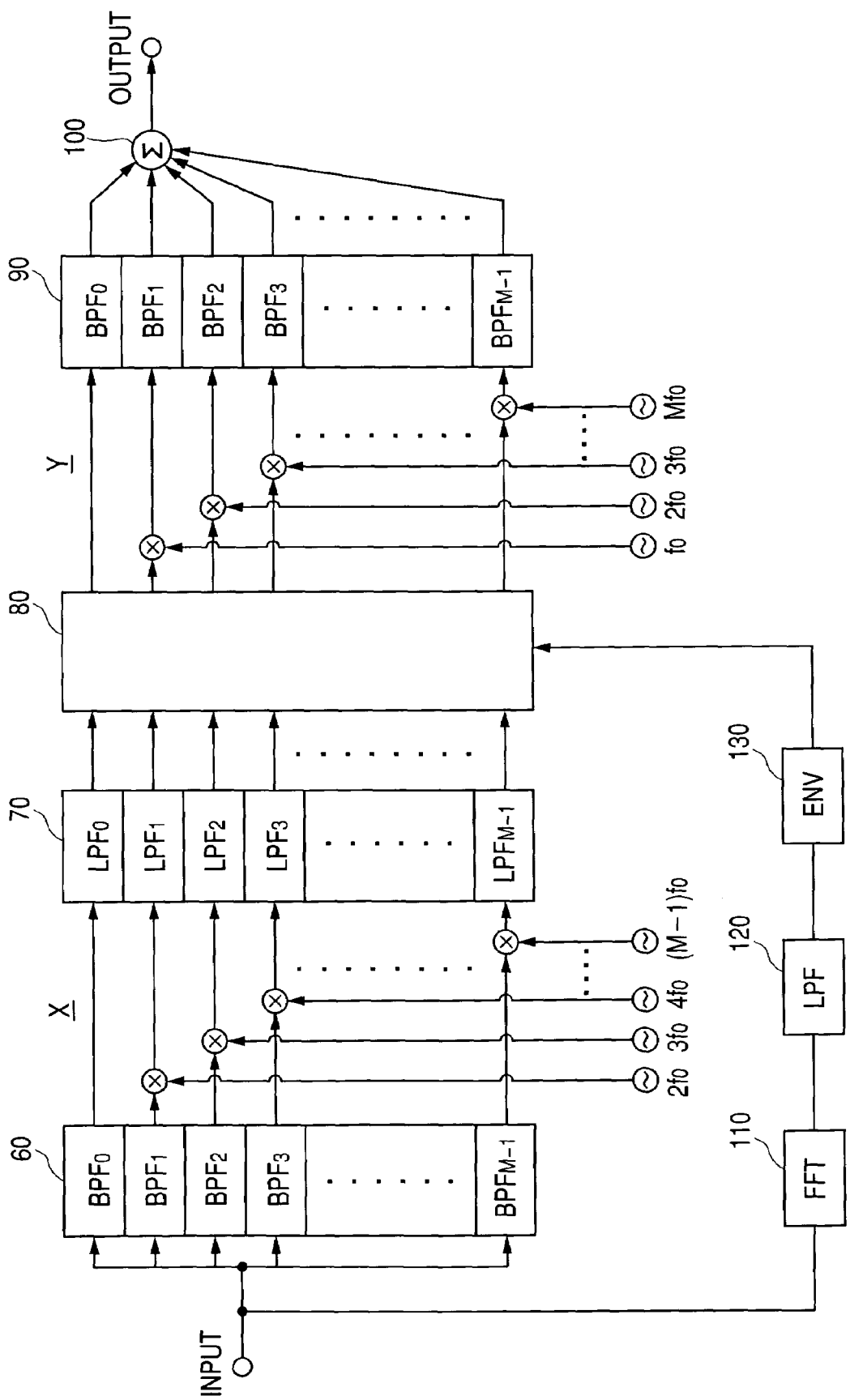
FIG. 4 is a circuit block diagram of a frequency interpolation apparatus according to an embodiment of the invention.

FIG. 2(c) shows the frequency spectrum distribution before frequency interpolation, whereas FIG. 3(a) shows the spectrum distribution after frequency interpolation. As shown, the spectrum distribution in the suppressed bands $F_6$, $F_7$ and $F_8$ are interpolated. FIG. 3(b) shows the spectrum distribution after frequency inverse-conversion. FIG. 3(c)

shows the signal having the spectrum distribution shown in FIG. 3(b) in the time domain, i.e., the time sequential output signal after frequency interpolation. FIG. 4 is a diagram showing a frequency interpolation apparatus according to a preferred embodiment of the invention.

The band division signal components $S_1, S_2, S_3, \ldots, S_{M-1}$, described with reference to FIG. 1 are generated by M band pass filters 60 ($BPF_0$ to $BPF_{M-1}$). The signal components $S_1, S_2, S_3, \ldots, S_{M-1}$ are multiplied by a sine signal $Sin(2n_0t)$ having a frequency $nf_0$ (n=2, 3, ..., M) at mixers X and supplied to low pass filters 70 ($LPF_0, \ldots, LPF_{M-1}$) whereat the frequency band of each of the signal components is shifted to the lowest frequency band [0, $f_0$]. An integral part of the band pass filter 60, mixer X and low pass filter 70 is known as a quadrature mirror filter (QMF) analyzer to those skilled in the art of this field. The signal components having different frequency bands are converted into the signal components having the same frequency band. This is significant in that "a set of filter output signals from the band pass filters ($BPF_0$ to $BPF_{M-1}$) is input to one filer band having a plurality of locations so that each signal Si (i=0 to M-1) stored at each location of the filter bank can be read as desired and the signals can be exchanged, added, subtracted or copied freely". The signal components $S_0', S_1', \ldots, S_{M-1}'$ with the shifted frequency bands are supplied to a frequency interpolation unit 80 whereat as will be later described, the frequency components in the suppressed frequency bands are generated through synthesis and used for interpolation. To this frequency interpolation unit, the input signal frequency-analyzed (typically Fourier transformed) by a frequency analyzer (FFT) 110 and low-pass filtered by a low pass filter (LPF) 120) is being input. Although the operation and function of FFT 110 and LPF 120 will be laster detailed, FFT 110 and LPF 120 are used basically to detect unknown suppressed specific bands of the input signal and obtain the envelope information of the residual spectra for determining the level of each interpolation signal. The signals $S_0'', S_1'', S_2'', \ldots, S_{M-1}''$ interpolation-processed by the frequency interpolation unit 80 (signals with the suppressed frequency components recovered through synthesis and added) are multiplied at a mixer unit Y by a sine signal $Sin(2n'f_0t)$ having a frequency of $n'f_0$ (n'=1, 2, 3, ..., (M-1)) and input to low pass filters 90 ($LPF_0$ to $LPF_{M-1}$) to filter the low frequency components, so that the signal components $S_0'', S_1'', \ldots, S_{M-1}''$ after interpolation recover the original frequency bands.

An integral part of the mixer 80 and LPF is known as a QMF synthesizer to those skilled in the art of this field.

Lastly, the signal components $S_i''$ (i=0 to (M-1)) are added together by an adder 100 to output an output signal b.

The structure and signal processing function of the frequency interpolation unit 80, which is the main feature of the invention, will be described.

As described earlier, to the frequency interpolation unit 80, M band divided and frequency converted signal components $S_0', S_1', \ldots, S_{M-1}'$ are input, and the interpolation processed signal components $S_0'', S_1'', \ldots, S_{M-}''$ are output.

According to the interpolation process of the invention, the signal components in the frequency components suppressed bands are generated through synthesis of linear combination of the frequency components in the frequency components residual bands.

The input/output relation of the frequency interpolation unit 80 capable of representing the outputs by linear combination of the inputs can be represented generally by:

$$\begin{bmatrix} S_0'' \\ S_1'' \\ S_2'' \\ \vdots \\ S_{M-1}'' \end{bmatrix} = \begin{bmatrix} a_{11} & a_{12} & a_{13} & \ldots & a_{1,M} \\ a_{21} & a_{22} & a_{23} & \ldots & a_{2,M} \\ a_{31} & \ldots & \ldots & \ldots & \ldots \\ \vdots & & & & \vdots \\ a_{M,1} & \ldots & \ldots & \ldots & a_{M,M} \end{bmatrix} \begin{bmatrix} S_0' \\ S_1' \\ S_2' \\ \vdots \\ S_{M-1}' \end{bmatrix} \quad (1)$$

It is herein assumed that of the M frequency bands, the frequency components in the frequency bands $F_{M-3}$, $F_{M-2}$ and $F_{M-1}$ in the high frequency part were suppressed (i.e., $S_{M-3}'=S_{M-2}'=S_{M-1}'\approx 0$. In this case, the frequency components in the remaining frequency bands are not 0, i.e., $S_0'=S_1'=\ldots=S_{M-1}'$ is not 0. If it is assumed that the input signal components in the band other than the suppressed bands are output as they are, then the above expression (1) can be expressed by:

$$\begin{bmatrix} S_0'' \\ S_1'' \\ S_2'' \\ \vdots \\ S_{M-3}'' \\ S_{M-2}'' \\ S_{M-1}'' \end{bmatrix} = \begin{bmatrix} 1 & 0 & 0 & \ldots & \ldots & 0 & 0 & 0 \\ 0 & 1 & 0 & \ldots & \ldots & 0 & 0 & 0 \\ 0 & 0 & 1 & 0 & \ldots & 0 & 0 & 0 \\ 0 & 0 & 0 & 1 & 0 & \ldots & 0 & 0 \\ & & & \vdots & & & & \\ a_{11} & a_{12} & a_{13} & \ldots & \ldots & \ldots & a_{1M-3} & \ldots & a_{1M3} \\ a_{21} & a_{22} & \ldots & \ldots & \ldots & \ldots & \ldots & \ldots \\ a_{31} & a_{32} & \ldots & \ldots & \ldots & \ldots & a_{3M-3} & \ldots & a_{3M} \end{bmatrix} \begin{bmatrix} S_0' \\ S_0' \\ \vdots \\ S_{M-4} \\ 0 \\ 0 \\ 0 \end{bmatrix} \quad (2)$$

The values of linear combination coefficients $a_{11}, a_{12}, a_{13}, \ldots, a_{21}, a_{22}, a_{23}, \ldots a_{3(M-3)}$ are generally determined from the characteristics of residual spectra of the signal. In this invention, as will be later described, these coefficient values are determined from the estimated value of the signal level to be interpolated for the suppressed frequency and from the envelope information of the residual spectra.

Figure 5:
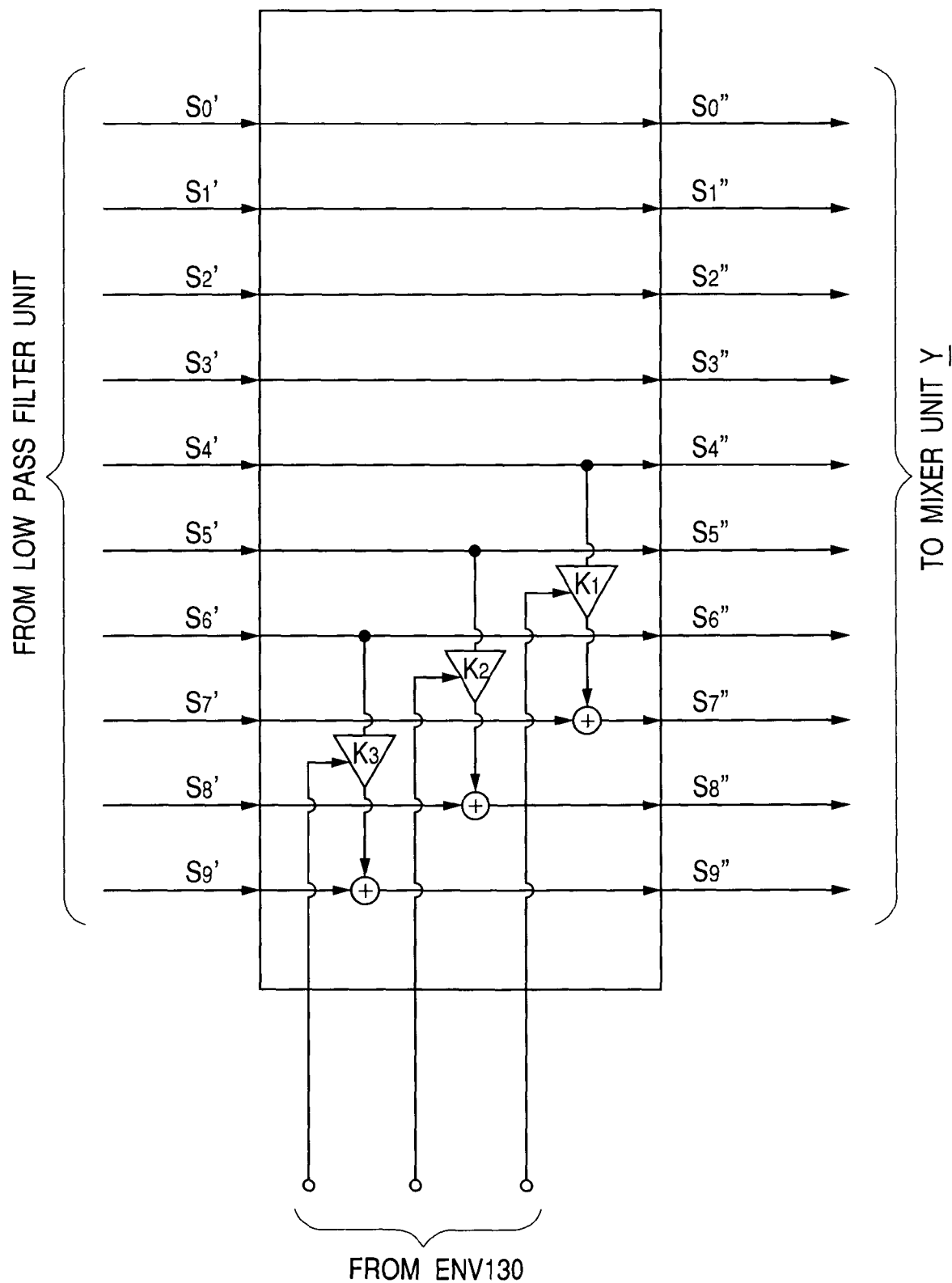
FIG. 5 is a diagram showing the specific internal structure of a frequency interpolation unit of the circuit shown in FIG. 4.

FIG. 5 is a diagram showing the specific example of the structure of the frequency interpolation unit 80. In this example, a signal is divided into ten frequency bands $F_0, F_1, F_2, F_3, \ldots, F_7, F_8$ and $F_9$ and ten signal components after frequency conversion $S_0', S_1', S_2', \ldots, S_7', S_8'$ and $S_9'$ a generated. Three bands $F_7, F_8$ and $F_9$ in the higher frequency part are assumed to be suppressed bands. In the example shown in FIG. 5, the suppressed band $F_7$ is added with (i.e., the signal components in the suppressed band are generated through interpolation) the signals $C_4', C_4'$ and $C_6'$ in the adjacent frequency bands $F_4, F_5$ and $F_6$ on the low frequency side attenuated by predetermined levels, i.e., $k_1C_4', k_2C_5'$ and $k_{d3}C_6'$ where $k_1, k_2$ and $k_3$ are weighting coefficients smaller than 1. In this example, some of the linear combination coefficients in the above-described expression (2) are replaced by:

$$\begin{bmatrix} a_{11} & a_{12} & a_{13} & \ldots & a_{17} \\ a_{21} & a_{22} & a_{23} & \ldots & a_{27} \\ a_{31} & a_{32} & a_{33} & \ldots & a_{37} \end{bmatrix} = \begin{bmatrix} 0 & 0 & 0 & \ldots & k_1 & 0 & 0 \\ 0 & 0 & 0 & \ldots & 0 & k_2 & 0 \\ 0 & 0 & 0 & \ldots & 0 & 0 & k_3 \end{bmatrix}$$

The coefficients $k_1, k_2$ and $k_3$ smaller than 1 are obtained in accordance with the envelope function of residual spectra of a signal, as will be later described.

FIGS. 6(a) and 6(b) show other examples of the frequency interpolating manipulation given in a different expression. In the example shown in FIG. 6, it is assumed that a signal is divided into nineteen bands ($F_0, F_1, \ldots, F_{18}$) and the bands $F_{14}, F_{15}, F_{16}, F_{17}$ and $F_{18}$ are suppressed bands. In the example shown in FIG. 6(a), the signals $C_9'$ to $C_{13}'$ in the residual bands $F_9$ to $F_{13}$ are added to the corresponding suppressed bands $F_{14}$ to $F_{18}$. In the example shown in FIG. 6(b), signals $C_{14}'$ to $C_{18}'$ to be interpolated to the suppressed bands $F_{14}$ to $F_{18}$ are calculated by:

$$C_{14}' = \frac{1}{10}C_0' + \frac{2}{10}C_1' + \frac{3}{10}C_2' + \ldots + C_9'$$

$$C_{15}' = \frac{1}{11}C_0' + \frac{2}{11}C_1' + \frac{3}{11}C_2' + \ldots + \frac{10}{11}C_9' + C_{10}'$$

$$\vdots$$

$$C_{18}' = \frac{1}{14}C_0' + \frac{2}{14}C_1' + \ldots + C_{13}'$$

Namely, weighting is performed depending upon the contribution percentage. A largest weighting factor "1" is given to the signal components (e.g., $C_9'$) in the interpolation band (e.g., $F_9$) corresponding to the suppressed band (e.g., $F_{14}$), and the weighting factor is gradually lowered as the band moves further away from the interpolation band (e.g., $F_9$).

The interpolating manipulation shown in FIG. 6(b) can be expressed in the expression format of the matrix formula (1) as in the following:

$$\begin{bmatrix} S_0'' \\ S_1'' \\ S_2'' \\ \vdots \\ \vdots \\ S_{14}'' \\ S_{15}'' \\ \vdots \\ S_{18}'' \end{bmatrix} \begin{bmatrix} 1 & 0 & 0 & \ldots & \ldots & \ldots & \ldots & \ldots & \ldots & \ldots & \ldots \\ 0 & 1 & 0 & \ldots & \ldots & \ldots & \ldots & \ldots & \ldots & \ldots & \ldots \\ 0 & 0 & 1 & 0 & \ldots & \ldots & \ldots & \ldots & \ldots & \ldots & \ldots \\ 0 & 0 & 0 & 1 & 0 & \ldots & \ldots & \ldots & \ldots & \ldots & \ldots \\ 0 & 0 & 0 & 0 & 1 & \ldots & \ldots & \ldots & \ldots & \ldots & \ldots \\ \ldots & \ldots & \ldots & \ldots & \ldots & \ldots & \ldots & \ldots & \ldots & \ldots & \ldots \\ \ldots & \ldots & \ldots & \ldots & 0 & 1 & 0 & \ldots & \ldots & \ldots & \ldots \\ \frac{1}{10} & \frac{2}{10} & \ldots & \ldots & \ldots & \frac{8}{10} & \frac{9}{10} & 1 & \ldots & \ldots & \ldots \\ \frac{1}{11} & \frac{2}{11} & \ldots & \ldots & \ldots & \ldots & \frac{10}{11} & 1 & \ldots & \ldots & \ldots \\ \ldots & \ldots & \ldots & \ldots & \ldots & \ldots & \ldots & \ldots & \ldots & \ldots & \ldots \\ \frac{1}{14} & \ldots & \ldots & \ldots & \ldots & \ldots & \ldots & \frac{13}{14} & 1 & \ldots \end{bmatrix} \begin{bmatrix} S_0' \\ S_0' \\ \vdots \\ 0 \\ 0 \\ \vdots \\ 0 \end{bmatrix}$$

Next, the functions of the frequency analyzer 110 (specifically a Fourier transformer), low pass filter 120 and spectrum envelope detector 130 shown in the block diagram of FIG. 4 will be described. With these constituent units, the input signal is frequency-analyzed (specifically Fourier-transformed) by the frequency analyzer 110 to discriminate (if not already known) the suppressed frequency bands and extract spectrum envelope information of the residual frequency components. Since the spectra of the input signal change from time to time, frequency analysis is realized by short time spectrum analysis. Typically, discrete Fourier transform is performed for predetermined sample values in each frame by setting a predetermined time widow to a digital input signal. The detected frequency analyzed data (e.g., parameters such as complex number Fourier coefficients obtained by FFT calculations) changes with each frame. In order not to make the detected frequency analyzed data change stepwise and discontinuously, i.e., in order to suppress a rapid change in the analyzed data, this data is passed through the low pass filter (LPF) 120 to smooth it. A change in parameter values before and after the smoothing process is shown in FIGS. 7(a) and 7(b). It is therefore possible to avoid interpolation for high frequency bands and minimize the waveform distortion after the interpolation.

Lastly, in accordance with the frequency analyzed data, the spectrum envelope detector 130 expresses the spectrum envelope in the residual frequency bands by using the function expression, and calculates the frequency interpolation weighting coefficients (e.g., $k_1$, $k_2$, $k_3$) for the frequency interpolation unit.

It is assumed that the frequency analysis result of an input signal provides short time spectra for a certain frame such as shown in FIG. 8(a), where $f_c$ is the lower limit frequency of the suppressed band. A function expression representative of the quantitative data of the spectrum envelope characteristics is obtained from the residual spectrum pattern (a). For example, in the most simple case, a first order function approximating the envelope is obtained by a least square approximation method as:

$$F(f) = Af + B \quad (5)$$

Specifically, a given frequency band of a spectrum intensity SP(f) as a function of frequency is equally divided by N, and averaged and sampled at an interval f to obtain sampled values $SP_1, SP_2, \ldots, SP_{N-1}$ and $SP_N$ (in the example shown, $SP_1$ to $SP_{10}$). The coefficients A and B of the first order expression (5) are obtained in such a manner that the following measure is minimized:

$$\delta = \frac{1}{N} \sum_{i=1}^{N} (H(f_i) - SP_i)^2 \quad (6)$$

Next, spectrum intensities L (interpolation coefficients) of the suppressed bands to be interpolated are calculated from the first order expression. In this case, the interpolation coefficients L (spectrum intensities of signals to be interpolated) are determined so that the spectrum envelope after interpolation can also be approximated at a high precision by the first order expression. The frequency points of the suppressed bands to be interpolated are represented, for example, by M points including $SP_{N+1}, SP_{N+2}, \ldots SP_{N+M}$ (in the example shown in FIG. 8(b), three points including $S_8, SP_9$ and $SP_{10}$). The frequency components at M point in the suppressed band are interpolated by the frequency points $SP_{N-M}, SP_{N-M+1}, SP_{N-M+2}, \ldots, SP_N$ (more precisely multiplied by L) (in the example shown, $SP_5, SP_6$ and $SP_7$). In this case, the values L are determined in such a manner that the root mean square given by the following expression takes a minimum value:

$$\delta' = \frac{1}{N} \sum_{i=1}^{N} (H(f_i) - SP_i)^2 + \quad (7)$$

$$\frac{1}{M} \sum_{j=1}^{M} (H(f_{N+j}) - SP_{N+j})^2$$

$$= \frac{1}{N} \sum_{i=1}^{N} (H(f_i) - SP_i)^2 +$$

$$\frac{1}{M} \sum_{j=1}^{M} (H(f_{N+j}) - k \times SP_{N-5+j})^2$$

The first term of the expression (7) is represented by the minimum value $_{min}$ calculated previously, and H(f) is already calculated as $H(f) = Af + B$ (A, B: constants) from the spectrum envelope characteristics of the bands with residual frequency components. By using these values, the interpolation levels (interpolation spectrum intensities) can be calculated.

Figure 9:
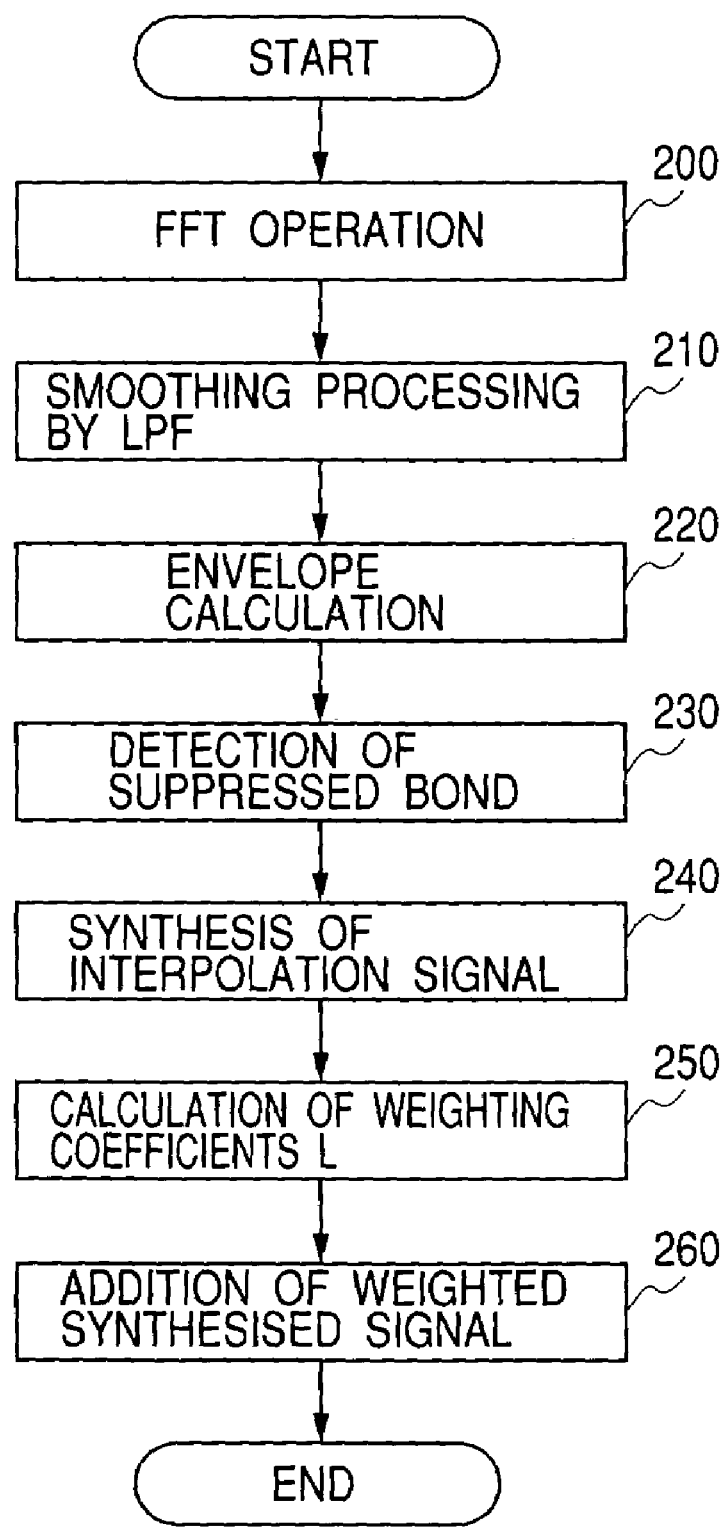
FIG. 9 is a flow chart illustrating a series of steps of extracting spectrum envelope information.

FIG. 9 is a flow chart illustrating the process of calculating interpolation coefficients in accordance with the spectrum envelope of residual frequency components of an input signal, as described above.

First, a given input signal is subjected to spectrum analysis (typically fast Fourier transform (FFT)) to obtain frequency analyzed parameters (typically complex number Fourier coefficients) representative of the frequency spectra of the input signal (Step 200). These parameters are obtained for each frame. In order to relax the discontinuous change (FIG. 7(*a*)) and obtain the waveform such as shown in FIG. 7(*b*), the parameters are passed through the low pass filter 120 shown in FIG. 4 to smooth the waveform (Step 210). By using the obtained spectrum parameters (e.g., complex number Fourier coefficients $R(f)$, $I(f)$, the amplitude term (root of $(R(f)^2+I(f)^2)$) of each spectrum is obtained to calculate the function representative of the spectrum envelope by the method described earlier (Step 220). The signal components (interpolation signals) in the suppressed bands are synthesized from the residual signal components (Step 240), and the interpolation signal levels (i.e., interpolation weighing coefficients L) are calculated from the envelope function expression $H(f)=Af+B$ (Step 250). Lastly, the weighted and synthesized signals (having the frequency components in the suppressed bands) are added to the band-limited signal to be interpolated.

Figure 10:
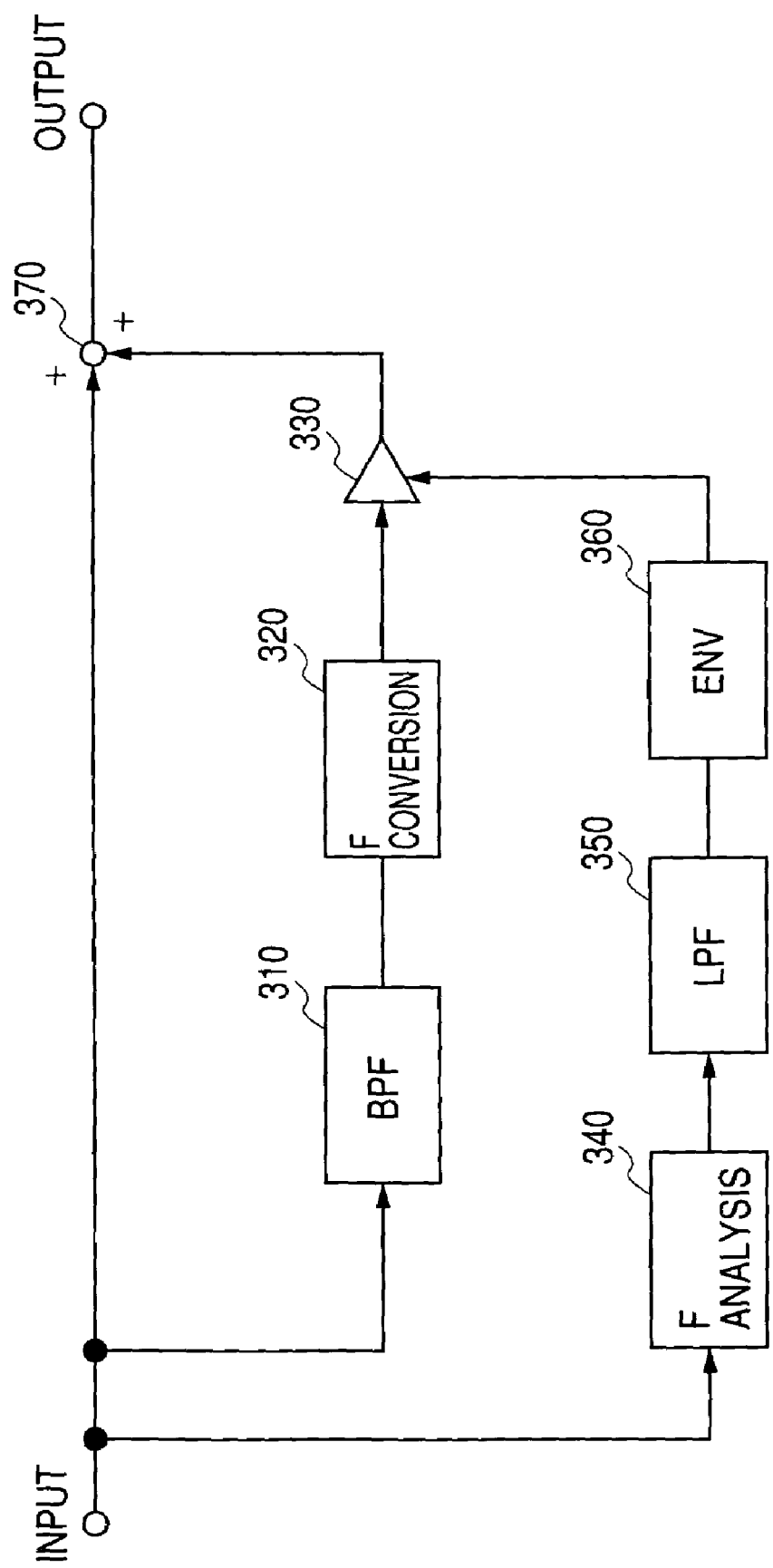
FIG. 10 is a block diagram showing a brief type frequency interpolation apparatus according to another embodiment of the invention.
Figure 11:
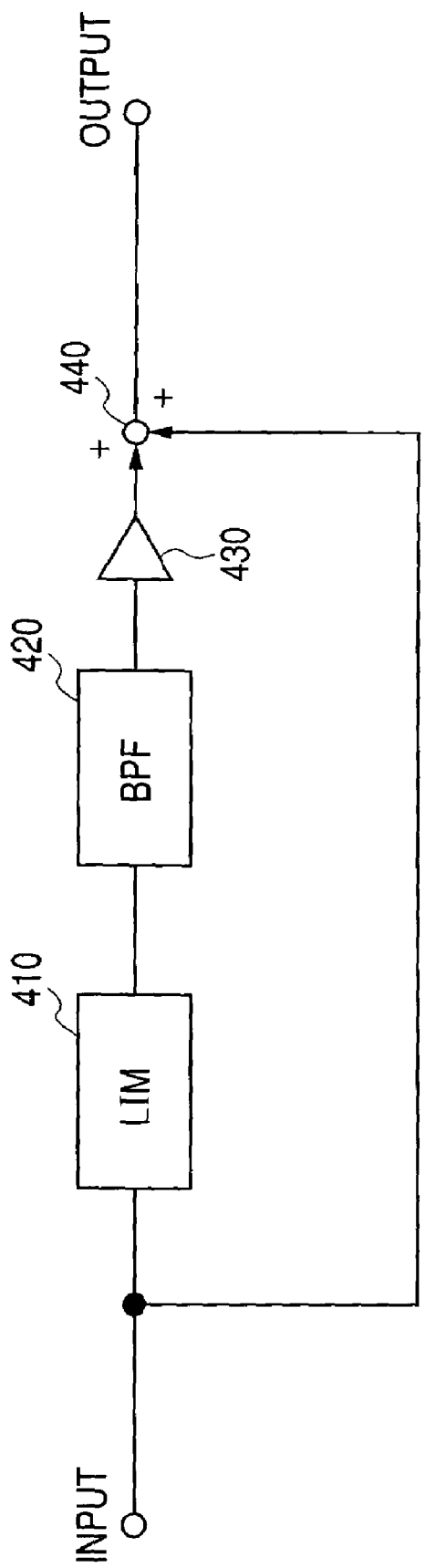
FIG. 11 is a diagram showing the fundamental structure of a conventional frequency interpolation apparatus using non-linear circuits.

In the frequency interpolation apparatus of the embodiment whose specific structure is shown in FIG. 4, after an input signal is divided into bands, the bands are changed to the same frequency band (e.g., band $[0, f_0]$). With this arrangement, although the operation of the filter bank can be simplified, the embodiment is not limited only to this. For example, if the frequency band to be used for interpolation is known in advance, the signal components in this band are extracted by using a band pass filter or the like and frequency-converted to the suppressed band. The circuit structure can therefore be simplified. An example of this simplified circuit structure is shown in FIG. 10. In this circuit, an input signal is passed through a band pass filter 310 to extract the signal components in the band to be used for interpolation (e.g., high frequency components in the band adjacent to the suppressed band) and frequency-convert the signal components to the suppressed band. In a particular specific frequency conversion method, the signal components are multiplied by a sine wave signal having a predetermined frequency and then filtered. For example, if the center frequency of the band to be used for interpolation is $f_1$ and the center frequency of the suppressed band is $f_2$, the signal to be used for interpolation (an output signal from the band pass filter 310) is multiplied by a sine wave having a frequency of $f_2-f_1$ (i.e., $\sin\{2(f_2-f_1)t\}$) to filter and extract only the signal components in the band near the frequency $f_2$. A multiplier 330 shown in FIG. 10 is used for multiplying a weighting coefficient. This coefficient is determined by the method described with the first embodiment. Namely, an input signal is frequency-analyzed to obtain a spectrum envelope function and in accordance with which the interpolation signal levels L (coefficients) are obtained.

INDUSTRIAL APPLICABILITY

It is possible to recover with a good similarity the high frequency components of an audio signal or the like from which the high frequency components were removed or suppressed, and to synthesize the signal approximate to the original signal. It is therefore possible to reproduce an audio signal of high quality with the sufficiently extended high frequency band. The amount of calculations of digital signal processing necessary for the frequency interpolation of this invention is relatively small so that the apparatus can be realized by small scale circuits and the cost can be reduced largely.

What is claimed is:

1. A frequency interpolation apparatus for reproducing a signal similar to an original signal by approximately recovering suppressed frequency components, from an input signal having the suppressed frequency components in a specific frequency band of the original signal, wherein the input signal is divided into a plurality of signal components having respective frequency components in a plurality of frequency bands, and each of the plurality of divided signal components is frequency-converted to a signal component in the same frequency band, and a signal component set in the band with the suppressed signal components is synthesized by executing a linear combination operation on the frequency-converted signal components, wherein the synthesized signal component set is frequency-converted to the specific frequency band, and a level of the synthesized signal component set is determined on the basis of the spectrum envelope information which is extracted from the frequency components not suppressed but residual in the original signal, and wherein the synthesized signal component set, which has been frequency-converted and whose level has been determined, is added to the input signal to recover the original signal.

2. The frequency interpolation apparatus according to claim 1, wherein the spectrum envelope information is represented by a function expression obtained through frequency analysis of the input signal.

3. The frequency interpolation apparatus according to claim 2, wherein the function expression is a first order function.

4. The frequency interpolation apparatus according to claim 1, wherein the plurality of divided signal components are generated by using a plurality of band pass filters each having a constant pass band width.

5. The frequency interpolation apparatus according to any one of claims 1, 2 to 4, wherein the input signal is a digital audio signal obtained by sampling and quantizing an analog audio signal.

6. A frequency interpolation apparatus for reproducing a signal similar to an original signal by approximately recovering suppressed frequency components, from an input signal having the suppressed frequency components in a specific frequency band of the original signal, the frequency interpolation apparatus comprising:

means for dividing the input signal into a plurality of signal components having respective frequency components in a plurality of frequency bands;

means for frequency-converting the plurality of divided signal components to make each signal component have the same frequency band;

means for frequency-analyzing the input signal to extract spectrum envelope information of residual frequency components;

means for synthesizing an interpolation signal component having the suppressed frequency components by executing a linear combination operation on the divided and frequency-converted signal components, and determining the level of the synthesized interpolation signal component on the basis of the extracted spectrum envelope information; and means for inverse-frequency converting the frequency-converted signal components with the synthesized interpolation signal component being added to recover the signal components in the original frequency band.

7. A frequency interpolation method of reproducing a signal similar to an original signal by approximately recovering suppressed frequency components, from an input signal having the suppressed frequency components in a specific frequency band of the original signal, the frequency interpolation method comprising the step of:

dividing the input signal into a plurality of signal components having respective frequency components in a plurality of frequency bands;

frequency-converting each of the plurality of divided signal components to a signal component in the same frequency band;

synthesizing a signal component set in the band with the suppressed signal components by executing a linear combination operation on the frequency-converted signal components:

frequency-converting the synthesized signal component sets to a specific frequency band;

determining a level of the synthesized material signal component set on the basis of the spectrum envelope information which is extracted from the frequency components not suppressed but residual in the original signal; and adding the synthesized material signal component set, which has been frequency converted and whose level has been determined, to the input signal to recover the original signal.

8. A frequency interpolation method of reproducing a signal similar to an original signal by approximately recovering suppressed frequency components, from an input signal having the suppressed frequency components in a specific frequency band of the original signal, the frequency interpolation method comprising the steps of:

dividing the input signal into a plurality of signal components having respective frequency components in a plurality of frequency bands;

frequency-converting the plurality of divided signal components to make each signal component have the same frequency band;

frequency-analyzing the input signal to extract spectrum envelope information of residual frequency components;

synthesizing an interpolation signal component having the suppressed frequency components by executing a linear combination operation on the divided and frequency-converted signal components and determining the level of the synthesized interpolation signal component on the basis of the extracted spectrum envelope information; and inverse-frequency converting the frequency-converted signal components with the synthesized interpolation signal component being added to recover the signal components in the original frequency band.

* * * * *